Dec. 9, 1958 A. W. SCHUELER 2,863,985
MAGNETIC FORCE WELDERS
Filed Sept. 30, 1957 2 Sheets-Sheet 1
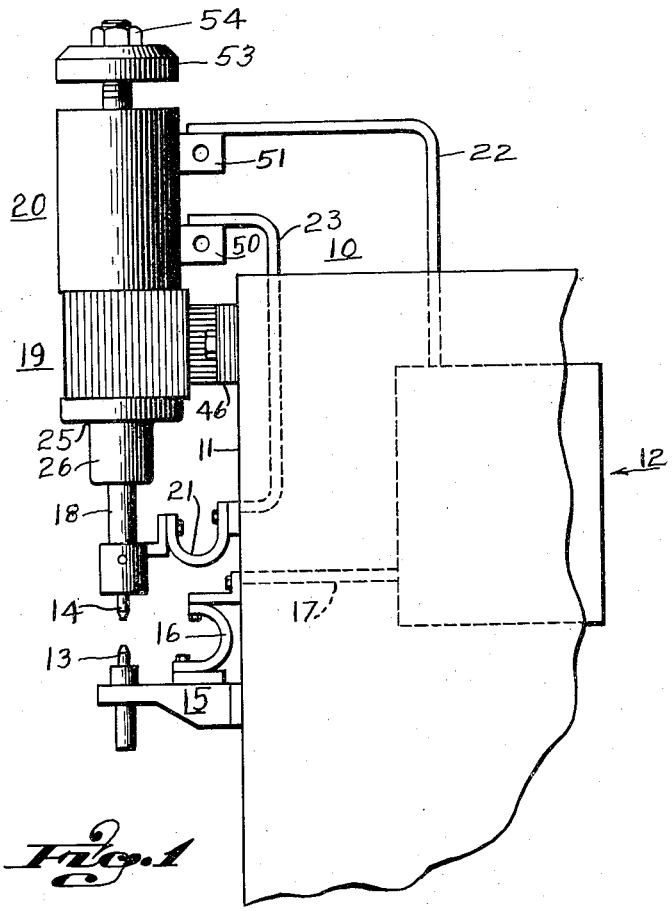
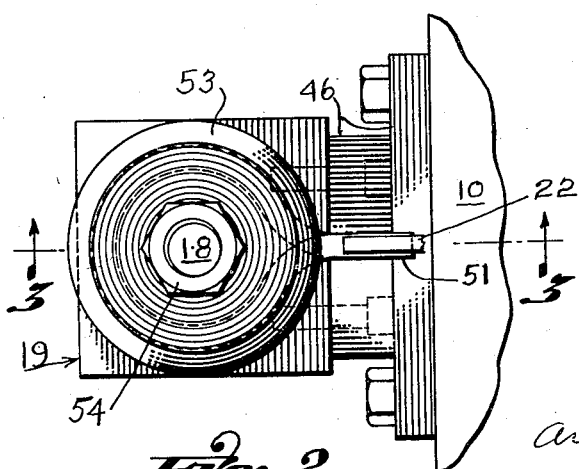
INVENTOR.
Arthur W. Schueler
BY Gerald B. Tjoflat
His Attorney Dec. 9, 1958 A. W. SCHUELER 2,863,985
MAGNETIC FORCE WELDERS
Filed Sept. 30, 1957 2 Sheets-Sheet 2

INVENTOR.
Arthur W. Schueler
BY Gerald B. Tjoflat
His Attorney

United States Patent Office

2,863,985
Patented Dec. 9, 1958

2,863,985

MAGNETIC FORCE WELDERS

Arthur W. Schueler, Cincinnati, Ohio, assignor to Precision Welder & Machine Company, Cincinnati, Ohio, a corporation of Ohio Application September 30, 1957, Serial No. 687,044

14 Claims. (Cl. 219—86)

This invention relates to resistance welders of the magnetic force type and more particularly to an improved electromagnetic force producing mechanism therefor.

In magnetic force resistance welders, the electromagnet structure as heretofore constructed has been very inefficient because of the extremely large loss of flux through leakage.

An object of this invention is to provide an improved electromagnet for magnetic force welders that will materially minimize flux leakage and greatly improve the efficiency of the magnet.

Another object is to provide an electromagnet structure for welders of the above type in which the stator members and the magnetizing turn or turns are concentric and coaxial.

Another object is to provide a magnet having an outer shell of magnetic material, a concentric core that is spaced from the shell and a turn or turns in the space between the shell and the core that are coaxial and concentric therewith.

A further object is to provide an electromagnet as set forth in the next preceding object in which the core is provided with a bore to accommodate a shaft or rod that actuates one of the welder electrodes and which is provided with an armature mounted in flux linking relation with the shell, core and the magnetizing turn or turns.

A still further object is to provide an electromagnet as set forth in the next preceding objects that is provided with a fluid pressure actuator for operating the electrode rod to or from the work engaging position of the electrodes.

The foregoing and other objects of the invention will be apparent to those of ordinary skill in the art to which the invention pertains from the following description taken in conjunction with the accompanying drawings.

In the drawings:

Figure 1 is a fragmentary view in elevation of a resistance welder provided with a movable electrode actuator and an electromagnetic force producing device arranged and constructed in accordance with the invention;

Fig. 2 is a top plan view of the welder shown in Fig. 1;

Figure 3:
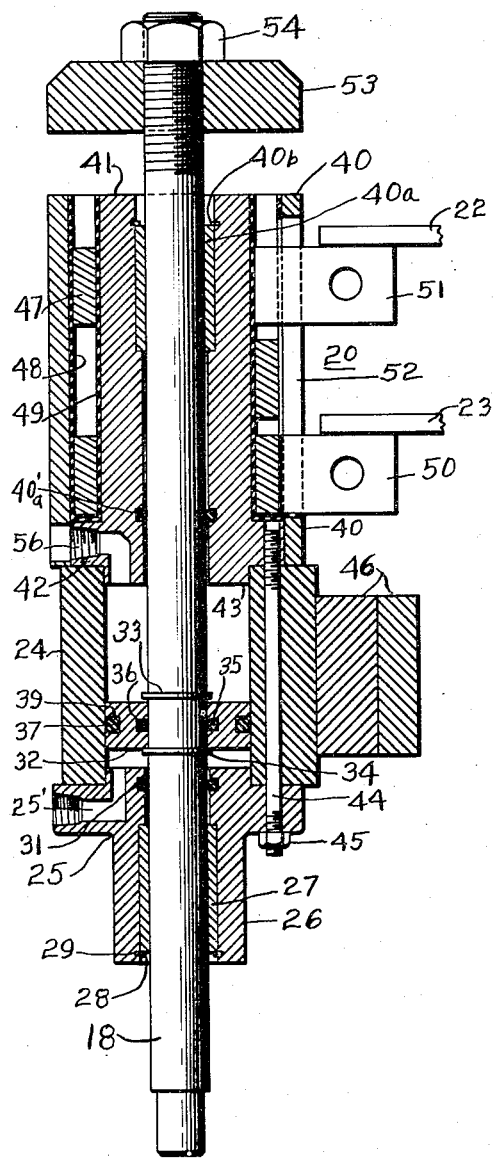
Fig. 3 is a view in section taken on line 3—3 of Fig. 2.

In Fig. 1, a resistance welder 10 is shown that comprises a frame 11 on which is mounted electric power supply source control equipment indicated generally at 12 for supplying phase controlled electric current to the electrodes whereby the magnitude and the duration of flow of current to the weld are controlled as required by the work at hand.

The welder is provided with relatively movable electrodes 13 and 14. Electrode 13 is shown as being stationary and supported on bracket or knee 15, and connected by a flexible conductor 16 to a power source lead or cable 17.

Electrode 14, being movable, is secured to a reciprocatable non-magnetic rod 18 provided with an actuator 19 and an electromagnetic force producing device 20. Actuator 19 is utilized to actuate electrode 14 to or from work engaging position while device 20 exerts welding pressure on the work through the electrode 14 while the weld current flows.

Electrode 14 is connected by a flexible lead 21 to a power source lead or cable 22 through a cable 23 and the energizing winding of device 20, the latter being in series therewith as will be explained infra.

Figure 4:
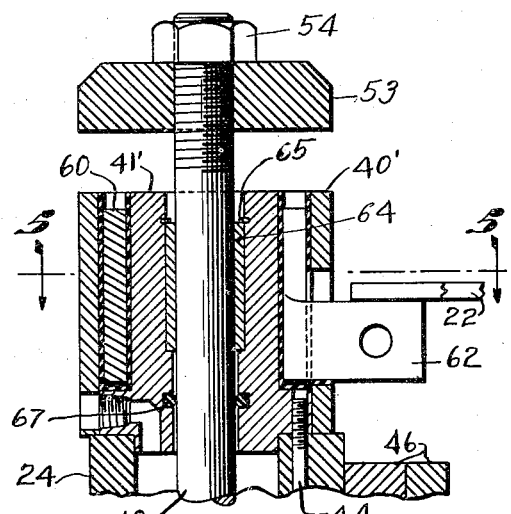
Fig. 4 is a view of a modified form of electromagnet for the welder of Fig. 1.
Figure 5:
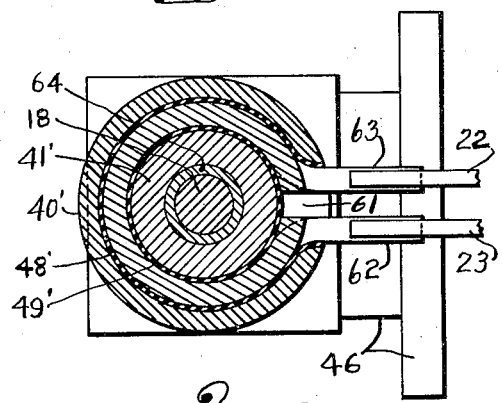
Fig. 5 is a view in section taken on line 5—5 of Fig. 4.

The devices 19—20 may be of the construction shown in Fig. 3. The magnetic force mechanism thereof may also be constructed as shown in Figs. 4 and 5.

As shown in Fig. 3, the actuator 19 and the device 20 are so designed as to form a compact assembly, and that certain parts of the one are common to the other.

Actuator 19 comprises a cylinder 24 having a cylinder head 25 at one end (the lower) which is provided with a fluid pressure supply port 25' and a tubular guide 26 containing a bushing 27 for accommodating the rod 18. Bushing 27 is retained by a snap ring 28 which is received in and retained by an annular slot 29 in the guide 26 by abutting the exposed end of the bushing, as shown. The rod is sealed at the inner end of the bushing 27 in any suitable manner as with an O-ring 31.

Rod 18 is provided with a piston 32 that is retained between annular shoulders 33 and 34 so spaced as to provide a limited amount of movement or lost motion with respect to the rod. The amount of lost motion is that which will allow device 20 to actuate the rod downwardly and force the electrode 14 against the work with the required weld pressure after the piston has reached the limit of its work engaging stroke.

The shoulders 33 and 34 may be formed by means of snap rings that are received in annular grooves in the rod.

The space between the piston 32 and the rod 18 may be sealed as at 35 by any suitable means, as for example, an O-ring which is retained in a groove 36 in the bore of the piston through which the rod extends. The piston is provided with a ring 37 which may also be an O-ring retained in an annular groove 39.

The magnetic device 20 comprises an outer shell 40 and an internal core 41, both of magnetic material, and which are concentric and coaxial with each other and the shaft 18. The lower end of the core 41 has an annular flange 42 that is received within the lower end of the shell 40. Projecting below the flange 42 is a boss 43 of reduced diameter that fits snugly into the bore of cylinder 24. Thus the lower part of core 41 forms a head for the cylinder 24. The core 41 is secured in pressure-tight relationship to the upper end of cylinder 24 by means of a plurality of threaded rods 44 (only one of which is shown). The upper ends of these rods are threaded into the core flange 42 and the lower ends are threaded to accommodate nuts 45 by means of which the cylinder and the cylinder head assemblies are rigidly coupled together. As shown in Figs. 1 and 2, the shell 40 is provided with a bracket 46 by means of which devices 19—20 may be secured to and supported by the frame 11 of the welder.

The core 41 has a central bore for accommodating and guiding rod 18, the lower end of the bore having a seal 40'a for preventing the escape of pressure along the rod. The upper end of the bore is provided with a rod guide bushing 40a, the latter being retained by a snap ring 40b which is seated in a groove in the bore as shown.

As shown in Fig. 3, the core 41 is spaced from the inner wall of the shell 40 to accommodate a magnetizing winding 47. The winding 47 is insulated from the shell 40 and the core 41 by means of insulation 48 and 49.

The winding 47, as shown in Fig. 3, comprises two turns of bar copper or other suitable conducting metal. The coil terminals 50 and 51 project through a slot 52 in the shell 40. With reference to Fig. 1 it will be seen that the terminal 50 is electrically connected to the cable 23 while the terminal 51 is connected to the cable 22.

The device 20 also includes an armature 53 that is mounted on and secured to the rod 18. It is preferred that the armature 53 be adjustably secured to the rod and for that purpose the rod and the armature are threaded as shown. A lock nut 54 is provided to secure the armature in its adjusted position. By means of the adjustable mounting for the armature 53, the air gap between the armature and the adjacent ends of the core 41 in the shell 40 may be adjusted as required.

In order to engage the electrodes 13 and 14 with the work, the work is placed on electrode 13 after which fluid pressure is admitted into cylinder 24 through a port 56. Only enough force is applied through the fluid pressure to engage the work. Upon engagement of the work, voltage is applied to the electrodes so that current flows. While the current is flowing, the electromagnetic device 20 is energized causing the armature 53 to be attracted to the adjacent ends of the shell 40 and core 41. That magnetic attraction exerts the welding pressure required on the work. The magnitude of the magnetic force may be controlled by adjusting the air gap between the armature 53 and the shell and core 40—41 to the required value when the electrodes are in engagement with the work.

In Figures 4 and 5, a modified form of device 20 is shown. It is so constructed as to be accommodated by the cylinder 24 as in Fig. 3, but only a single magnetizing turn is employed. Since one turn is employed, the core and shell are shorter than they are in Fig. 3. The shell 40' and the core 41' are spaced from each other to accommodate a single turn winding 60. The winding 60 comprises a cylinder of copper or other suitable conducting metal which is slotted as at 61. The single turn is provided with terminals 62 and 63, which are located at the lower end of the slotted cylinder. These terminals would be connected to the cables 22 and 23 and the electrode 14 in the same manner as in Fig. 1.

The core 41' is provided with a bore to accommodate the rod 18 and the upper end of that bore is provided with a guide bushing 64. The bushing is retained in position by means of a snap ring 65 received in an annular slot in the wall of the core bore at a location where it abuts the upper end of the bushing. The bore in the core is also provided with a seal, such as an O-ring 67, for sealing the space through which the rod 18 passes.

The magnetic device of Figs. 4 and 5 functions in the same manner as the device of Fig. 3.

In either form of magnetic device, the magnetic efficiency is greatly improved because the magnetizing turns are confined between two magnetic members of the stator, namely the shell and the core, so as to reduce leakage to a minimum. Therefore, the useful flux will be materially increased and will be confined to the air gap between the armature and the adjacent ends of the shell 40 and core 41 or the shell 40' and core 41'.

Having thus described the invention, it will be apparent to those of ordinary skill in the art to which the invention pertains that various modifications and changes may be made in the illustrated embodiments without departing from either the spirit or the scope of the invention.

Therefore, what is claimed as new and desired to be secured by Letters Patent is:

1. An electrode positioner and magnetic force producing mechanism for resistance welders, said electromagnet comprising a reciprocable electrode actuating member, a stator comprising spaced concentric, coaxial core members, one of said core members having a bore that is coaxial with said core members for accommodating said reciprocable member, a coil winding energizable by weld current, located in the space between said core members and embracing one of them, and an armature on said reciprocable member located adjacent one end of said magnetic stator.

2. A mechanism as in claim 1 in which one member of the stator is a hollow cylinder within which the other member is located in spaced relation thereto and that said latter member contains the bore for the reciprocable member, and that the coil winding is in the space between the stator members and embraces the stator member containing said bore.

3. A mechanism as in claim 1 in which means are provided for actuating the reciprocable member to or from working position.

4. A mechanism as in claim 2 in which means are provided for actuating the reciprocable member to or from working position.

5. A mechanism as in claim 1 in which the coil winding comprises at least one turn.

6. A mechanism as in claim 2 in which the coil winding comprises at least one turn.

7. A mechanism as in claim 1 in which the coil winding comprises a cylinder that is slotted from end to end to form a single turn.

8. A mechanism as in claim 2 in which the coil winding comprises a cylinder that is slotted from end to end to form a single turn.

9. A mechanism as in claim 1 in which the armature is adjustably mounted on said reciprocable member whereby the air gap between it and the stator may be predetermined.

10. A mechanism as in claim 2 in which the armature is adjustable on said reciprocable member whereby the air gap between it and the armature may be predetermined.

11. An electrode positioner and magnetic force producing mechanism for resistance welders comprising concentric and coaxial magnetic stator members having an annular space between them, a coil winding in said space, one of said stator members having a bore that is coaxial with said members, a non-magnetic rod in and extending through said bore for actuating a welder electrode to or from work engaging position, an armature on said rod adjacent one end of the stator, a cylinder adjacent the opposite end of the stator, a piston on said rod working in said cylinder, said piston being operable under fluid pressure to actuate the rod to or from the position in which the work is engaged by the electrodes.

12. A mechanism as in claim 11 in which the inner stator member constitutes a head for said cylinder and that the cylinder and inner stator member are secured together as a unitary structure.

13. A mechanism as in claim 11 in which the piston has a lost motion connection with said rod.

14. A mechanism as in claim 12 in which the piston has a lost motion connection with said rod.

References Cited in the file of this patent

UNITED STATES PATENTS

| | | |
|---|---|---|
| 2,312,938 | Steiglitz | Mar. 2, 1943 |
| 2,464,967 | Dinnich | Mar. 22, 1949 |
| 2,473,772 | Vang | June 21, 1949 |
| 2,776,362 | Welch | Jan. 1, 1957 |